United States Patent Office 2,988,553
Patented June 13, 1961

2,988,553
NOVEL ESTERS OF α-TOCOPHEROL AND THE ACID ADDITION SALTS THEREOF
Willi Küssner, Darmstadt-Eberstadt, and Hans-Walter Voigtländer, Darmstadt, Germany, assignors to E. Merck Aktiengesellschaft, Darmstadt, Darmstadt, Germany, a corporation of Germany
No Drawing. Filed Jan. 28, 1957, Ser. No. 636,516
Claims priority, application Germany Feb. 2, 1956
8 Claims. (Cl. 260—345.5)

This invention relates to α-tocopherol. In particular it is directed to novel esters thereof, especially the esters of alkylated amino carboxylic acids.

Free tocopherol is sparingly used as a drug due to its high sensitivity to oxidation. It is medicinally used more frequently as an ester, preferably as an acetyl compound. However, the aliphatic acid esters thereof have the disadvantage that they are insoluble in water which causes unavoidable resorption conditions. It has been attempted to eliminate this drawback by the esterification of the tocopherol with polybasic acids such as phosphoric acid or succinic acid and to convert them into water soluble salts of acidic esters. This method has met with little success because the mentioned compounds are stable only in neutral or slightly alkaline solutions. In the presence of acids, for example, in the stomach or in an acidic cell environment, the water insoluble acidic esters are again precipitated.

This invention provides novel amino acid esters of the α-tocopherol which affords the advantage, due to the amphoteric character thereof, that they also remain stable and soluble in an acidic environment.

Accordingly, the present invention resides in the provision and manufacture of esters of tocopherol with N-dialkylated aminoacetic acid which, due to their basic amino group, form water soluble salts which remain dissolved when further diluted with neutral or weakly acidic aqueous liquids, that is, for example, in the stomach juices. To this end, α-tocopherol chloroacetic acid ester, is reacted with dialkylamines, either in the presence or in the absence of a suitable solvent, whereby HCl is split off and a tertiary amino group is formed, and which may be used for the formation of salts by methods known per se.

The α-tocopherol chloroacetic acid ester used as the starting material can be produced in a manner known per se by the following steps:

(a) α-Tocopherol and chloroacetic acid chloride are heated in a water free solvent, as for example, toluene or xylene for a prolonged period on a water bath.

(b) Monochloroacetic acid is reacted, for example, in benzene with 2,5,6-trimethyl-4-hydroxy-1-diazonium hydrochloride whereby nitrogen is split off and 2,5,6-trimethyl hydroquinone-mono-chloroacetate-1 is formed. This compound is dissolved in benzene and heated with phytol or isophytol and zinc chloride on a water bath. The α-tocopherol chloroacetic acid ester is formed.

The following are illustrative examples in accordance with this invention:

Example 1

(a) 300 grams of mono-chloroacetic acid are dissolved in 600 ml. of benzene in a triple tubulated flask while being heated and stirred.

During the boiling, 200 grams of a suction filtered diazonium salt (2,5,6-trimethyl-4-hydroxy-1-diazonium hydrochloride) are added to the solution and boiled for two hours under reflux while being stirred whereby the nitrogen is evolved. After cooling, the benzene is distilled off at a pressure of 60 mm. Hg column, and subsequently the excess monochloracetic acid is distilled off from an oil bath. The residue from the distillation is taken up in ether and washed until neutral with a 1% solution of ammonia. The ethereal solution is dehydrated, filtered and distilled off. The residue is mixed with low boiling petroleum ether and the resulting crystals (trimethyl hydroquinone) are sucked off. The condensed mother liquor is subjected to a high vacuum distillation (1.5 mm. Hg column at a temperature of 145° to 170° C.). The product obtained is 2,5,6-trimethyl hydroquinone-monochlor acetate-(1) which melts at 116° to 117° C.

(b) 48 grams of this chloroacetate are dissolved in 200 ml. of benzene and stirred for five hours in a water bath with 30 grams of phytol or isophytol and 30 grams of $ZnCl_2$ while simultaneously introducing carbondioxide. The benzene solution is thereupon washed twice with 100 ml. of water each, treated with bleaching earth and distilled off. The residue is mixed with 60 ml. of petroleum ether for separating the unreacted chloroacetate. After distilling off the petroleum ether in the presence of carbon dioxide the α-tocopherol chloroacetate is left in form of a brown oil. It is purified by a high vacuum distillation (219° to 230° C. and 0.01 mm. Hg column). It is obtained as a light green, yellowish oil which solidifies after being left for sometime in the cold in form of bushel-like felted fine needles of α-tocopherol chloroacetate with crystalline structure.

(c) 10 grams of this substance (the product of (b)) are boiled with 15 ml. of diethylamine and 2.5 grams of sodium hydrogen carbonate for three hours while being refluxed. After adding 10 ml. of diethylamine the boiling is continued for additional two hours. After cooling, the substance is taken up in ether and the excess bicarbonate is filtered off. The diethylamine is washed out with dilute acetic acid, the ether is dehydrated and distilled off in the presence of carbon dioxide. The residual reddish yellow oil is the diethylamino acetic acid ester of the α-tocopherol.

Example 2

50 grams of α-tocopherol are dissolved in 200 ml. of toluene, and 50 grams of chloroacetic acid chloride are added to this solution. Subsequently the solution is heated on a steam bath for 12 hours under reflux while being stirred. Thereupon dry carbon dioxide is conducted through the reaction solution. Then the solution is diluted with the same volume of toluene and washed four times with 500 ml. of a 1% solution of sodium hydrogen carbonate ($NaHCO_3$). The last washing should show a neutral reaction. The dried and optionally bleached toluene solution is freed from the solvent under vacuum and the residue is subsequently distilled. The reaction with diethylamine is carried out in the same manner as has been described in Example 1, part (c).

Example 3

10 grams of α-tocopherol mono-chloroacetate, obtained in accordance with Example 1, part (b) or Example 2 are dissolved in 40 ml. of absolute alcohol. Then 2.5 grams of $NaHCO_3$ and within five hours 100 grams of 33% solution of dimethylamine in water are added in four portions while being continuously heated. After heating for five hours the excess dimethylamine is distilled off; the residue taken up in ether, and washed several times with 2% acetic acid. After drying and distilling off the ether, α-tocopherol dimethylamineacetate is obtained in form of a yellowish viscous oil.

Example 4

5 grams of α-tocopherol diethylaminoacetate are dissolved in 3 ml. of absolute alcohol and acidified with 2 normal alcoholic hydrochloric acid. After a short time, particularly short when placed on ice, the α-tocopherol diethylaminoacetate-hydrochloride crystallizes. It is also very convenient to produce the salt by dissolving the base in acetone and neutralizing it with alcoholic hydrochloric acid.

Fp.—156° to 157° C.

*Example 5*

By mixing an absolute alcoholic solution of α-tocopherol diethylaminoacetate with aqueous hydrobromic acid, a crystalline precipitation of the α-tocopherol-diethylaminoacetate-hydrobromide is immediately obtained.

Fp.—170° to 171° C.

*Example 6*

30 grams of a α-tocopherol dimethylaminoacetate are dissolved in four times the volume of acetone and acidified with ethereal hydrochloric acid, whereby crystallization of the α-tocopherol dimethylaminoacetate hydrochloride starts immediately. After sucking off, the crystals are redissolved once more in 30 times the volume of acetone.

Fp.—192° to 193° C.

α-Tocopherol dimethylaminoacetate-hydrobromide is produced in an analogous manner. The base is acidified with 66% of aqueous hydrobromic acid.

Fp.—202° to 203.5° C.

30 grams of the base are dissolved in four times the volume of acetone and acidified with alcoholic sulfuric acid. The α-tocopherol dimethylaminoacetate-sulfate immediately crystallizes out. The wax-like crystals are dissolved once more in acetone. The substance sinters at 225° C. and decomposes at 240° C. while forming bubbles.

*Example 7*

The α-tocopherol di-ethylaminoacetate is taken up in double its quantity of acetone; and the calculated quantity of tartaric acid is added thereto. The mixture is warmed until a homogeneous solution is obtained. Upon cooling, six volumes of isopropyl ether is added thereto. After standing in the cold the tartaric acid salt of the base precipitates; and it is removed by suction filtration. The salt is colorless and melts at 170° C. (under decomposition preceded by sintering).

The citric acid and phosphoric acid salts are prepared in the corresponding fashion.

It will be observed that the novel N-dialkylated amino acetic acid esters of this invention form well defined water-soluble salts. Such salts, accordingly, remain stable and soluble in an acidic environment; and accordingly, such stability and solubility thereof exists in the stomach or acidic cell environments.

It will be understood that the foregoing description of the invention and the examples set forth are merely illustrative of the principles thereof. Accordingly, the appended claims are to be construed as defining the invention within the full spirit and scope thereof.

We claim:

1. A member of the group consisting of α-tocopherol compounds of the formula

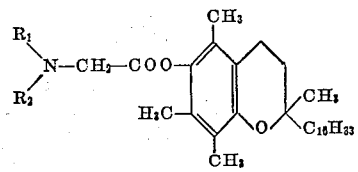

wherein $R_1$ and $R_2$ are alkyl radicals having from 1 to 2 carbon atoms and the pharmaceutically acceptable acid addition salts thereof.

2. N-dimethylamino acetic acid ester of α-tocopherol.
3. N-diethylamino acetic acid ester of α-tocopherol.
4. The physiologically safe acid addition salts of N-diethylamino-acetic acid ester of α-tocopherol.
5. The hydrochloride of the N-dimethylamino-acetic acid ester of α-tocopherol.
6. The phosphoric acid salt of the N-dimethylamino-acetic acid ester of α-tocopherol.
7. The hydrochloride of the N-diethylamino-acetic acid ester of α-tocopherol.
8. The tartaric acid salt of the N-diethylamino acetic acid ester of α-tocopherol.

References Cited in the file of this patent

UNITED STATES PATENTS

| | | |
|---|---|---|
| 2,393,134 | Aeschlimann | June 15, 1940 |
| 2,293,034 | Moore | Aug. 18, 1942 |
| 2,680,749 | Cawley et al. | June 8, 1954 |